E. E. ALLEN.
SKIVING MACHINE.
APPLICATION FILED DEC. 29, 1913.
1,131,589.
Patented Mar. 9, 1915.
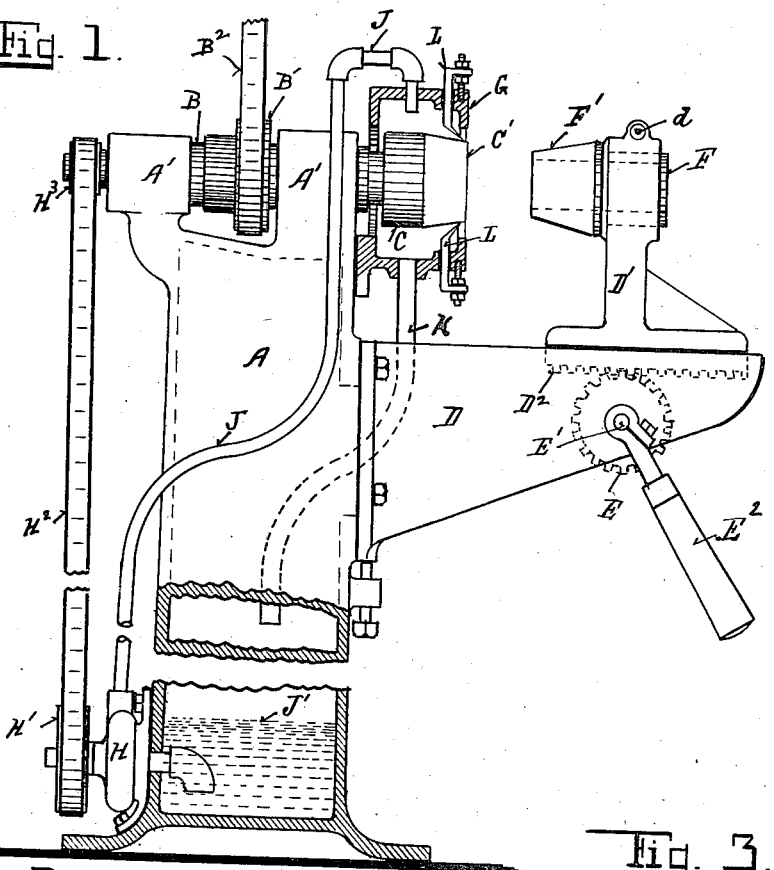
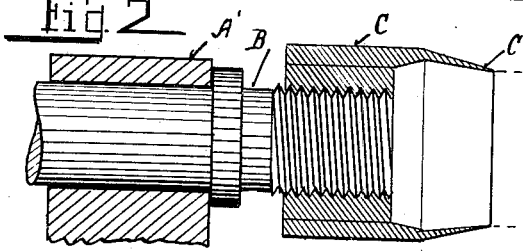
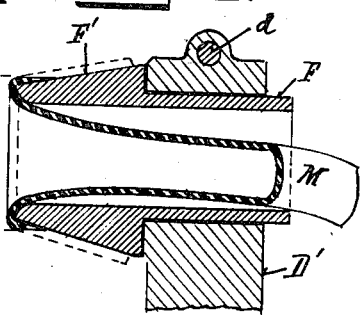
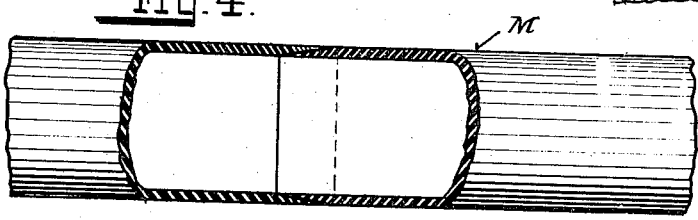
Witnesses.
E. E. Myers
Roy J. Clunk
Inventor
Edward E. Allen
By J. Armstrong
atty.

UNITED STATES PATENT OFFICE.

EDWARD E. ALLEN, OF ERIE, PENNSYLVANIA, ASSIGNOR TO ALLEN MACHINERY COMPANY, OF ERIE, PENNSYLVANIA, A CORPORATION OF PENNSYLVANIA.

SKIVING-MACHINE.

1,131,589.  Specification of Letters Patent.  Patented Mar. 9, 1915.

Application filed December 29, 1913. Serial No. 808,374.

*To all whom it may concern:*

Be it known that I, EDWARD E. ALLEN, a citizen of the United States, residing at Erie, in the county of Erie and State of Pennsylvania, have invented certain new and useful Improvements in Skiving-Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to skiving machines, and particularly to machines for skiving the ends of flexible tubes, whereby the extreme end or annular edge of the tube wall may be rendered paper-thin.

The object of my invention is to produce a machine which is adapted to skive the wall of a rubber tube so that the skived ends of such tube may be joined together to form an endless inner tube of a pneumatic tire, without increasing the thickness of the tube at the joint.

In carrying out the object of my invention, I have devised a rotary knife, which I mount upon a revolving spindle, and a hollow mandrel having a cylindrically inclined surface, which surface is presented to the cutting edge of said knife; within this hollow mandrel I place a rubber tube, turning the end of the tube backward over the outside of the mandrel. The mandrel with the tube so placed is then moved forward so that the edge of the knife will cut through that portion of the tube which lies against the cylindrically inclined surface of the mandrel, with the result that the wall of the tube is cut on lines at an angle to the axis of the tube; the edge of the knife entering one surface of the tube and emerging out of the outside surface thereof. These and other features of my invention will appear hereinafter in the specification and claims, and are illustrated in the accompanying drawings in which:—

Figure 1, is a side view in elevation of a skiving machine embodying my invention, with portions thereof broken away. Fig. 2, is a horizontal section of the rotary knife and a portion of its spindle in elevation. Fig. 3, is a like view of a hollow mandrel and a portion of its support, with a section of a rubber tube therein. Fig. 4, is a portion of an endless inner tube, with part thereof broken away, showing the skived ends joined together.

In these drawings, A, indicates the frame of my machine, which is hollow, and adapted to contain water or other fluid in the lower portion thereof. In the upper end of the frame A, are journal bearings A', in which bearings I mount a spindle B, upon which there is secured a pulley B', adapted to receive a driving belt B², leading to a suitable source of power. Upon one end of the spindle B, I secure a cylinder C, which is provided at one end, C', thereof, with a rotary cutting blade. Upon the frame A, I secure a bracket D; and upon this bracket D, I slidably mount a mandrel support D', having upon its lower end, within said bracket, a rack gear D². For moving this mandrel support D', toward and away from the rotary knife C', I provide a spur gear E, which is secured upon a shaft E', transversely journaled in the bracket D, so that said spur gear E, will inter-mesh with the rack gear D², on the mandrel support D'. For operating the spur gear E, and shaft E', I secure a lever E², on one end of the shaft E'. Secured in the mandrel support D', by means of a clamping bolt $d$, I place a hollow mandrel F; said mandrel having an inclined cylindrical surface F', against which surface, or in opposition to which surface, the rotary knife C', operates.

G, indicates a hollow, cylindrical shield, which surrounds and incloses the rotary knife C', and is secured upon the frame A. Upon one side of the frame A, I secure a pump mechanism H, which is driven by means of a pulley H', belt H², and pulley H³, on the spindle B. From the pump H, a pipe J, leads into the shield G, so as to discharge water or other lubricant J', from the interior of the lower portion of the frame A, upon the rotary knife C'. From the lower portion of the shield G, a drain pipe K, leads back into the frame A.

In order to lift the edge of the rubber being cut off of the outer surface of the rotary knife C', I provide adjustable fingers L, the point of which is adapted to enter between the rubber and the knife C', and to lift it sufficiently so that water or other lubricant from the pipe J, may enter therebetween.

In operation a rubber inner tube M, (see

Fig. 3) is inserted through the hollow mandrel F, and the end thereof turned backward over the outside of said mandrel, as shown by broken lines in Fig. 3. A lever E², is then operated to move the mandrel support D', and mandrel F, toward the rotary knife C, which movement is continued until the edge of said knife has cut through the wall of said tube M, from one surface to the opposite surface thereof, when the lever E², is reversed to move the mandrel backward away from the knife C'.

From the foregoing description of the operation of my improved skiving machine, it will be obvious that a rubber tube having both ends thereof skived, as described, can have those ends joined together without increasing the thickness of the tube walls, as shown in Fig. 4 of the drawings. It will also be obvious that many modifications of such a machine can be made by those skilled in the art, without departing from the spirit of my invention.

Therefore, having fully shown and described the construction and operation of my invention, so as to enable others to construct and operate the same, what I desire to secure by Letters-Patent is:—

1. The combination in a skiving machine of a rotary cutting knife, a hollow mandrel supported on and longitudinally movable along the axial lines of said knife, and having a tapering cylindrical surface in opposition to which said rotary knife may operate, substantially as and for the purpose set forth.

2. The combination in a machine of the class described, of a rotary knife adapted to make an annular cut parallel to the axis of its rotation, non-rotatable mechanism adapted to support the wall of a flexible tube in a conical form in opposition to said rotary knife, and mechanism to move said tube supporting mechanism toward and from said rotary knife, substantially as set forth.

3. The combination in a skiving machine of a hollow tapering mandrel, a rotary knife adapted to receive the smaller end of said mandrel within the orbit of its cutting edge and operate in opposition to the tapering surface of said mandrel, and means to move the one element toward the other, substantially as and for the purpose set forth.

4. The combination in a skiving machine of a frame, a spindle journaled therein, a driving pulley on said spindle, a hollow cylinder having a cutting blade at the open end thereof secured on said spindle, a slidable mandrel holder mounted on said frame, a hollow mandrel having a tapering surface adapted to enter into the open end of said hollow cylinder so that said cutting blade thereon will operate in opposition to tapering surface of said mandrel, and means to move said mandrel holder toward and away from said spindle, substantially as set forth.

5. The combination in a skiving machine, of a frame, journal bearings thereon, a spindle mounted in said bearings, a driving pulley on said spindle, a cylinder secured on said spindle having an annular cutting edge at the open end thereof, a shield inclosing said cylinder, a lubricant pipe leading into said shield, a drainage pipe leading therefrom, a hollow mandrel having a tapering cylindrical surface supported and longitudinally movable on the axial plane of said spindle, and means to move said mandrel forward and back, substantially as, and for the purpose set forth.

6. The combination in a skiving machine, of a frame, journal bearings thereon, a spindle mounted in said bearings, a driving pulley on said spindle, a cylinder secured on said spindle having a cutting edge at the open end thereof, a shield inclosing said cylinder, fingers secured in said shield obliquely contacting with said cylinder adjacent to said cutting edge, a hollow conical mandrel supported and longitudinally movable on the axial plane of said spindle, and means to move said mandrel forward and back, substantially as, and for the purpose set forth.

7. The combination in a skiving machine, of a rotary cutting blade, a hollow mandrel supported in and longitudinally movable along the axial line of said knife and having a tapering surface adapted to support the wall of a tube to be skived, in opposition to said knife, in an inclined position with relation to the axis of said knife, substantially as, and for the purpose set forth.

In testimony whereof I affix my signature, in presence of two witnesses.

EDWARD E. ALLEN.

Witnesses:
P. V. GIFFORD,
H. M. STURGEON.